United States Patent [19]

Lehan

[11] Patent Number: 4,868,039

[45] Date of Patent: Sep. 19, 1989

[54] STRUCTURAL PANEL INCORPORATING CLAY GROG AND VERMICULITE AND METHOD FOR MAKING SAID PANEL

[76] Inventor: Warren A. Lehan, P.O. Box 11623, Clearwater, Fla. 34616

[21] Appl. No.: 291,616

[22] Filed: Dec. 29, 1988

[51] Int. Cl.$^4$ .................. B22B 13/00; B28B 3/00
[52] U.S. Cl. ................... 428/241; 106/90; 106/97; 106/98; 264/333; 428/247; 428/283; 428/703
[58] Field of Search .............. 106/90, 97, 98; 264/333; 428/241, 247, 283, 703

[56] References Cited

U.S. PATENT DOCUMENTS

| | | | |
|---|---|---|---|
| 1,828,029 | 6/1929 | Marx et al. | |
| 3,051,590 | 8/1962 | Proux | 428/703 |
| 4,018,619 | 4/1977 | Webster et al. | 106/118 |
| 4,102,700 | 7/1978 | Kwech et al. | 106/100 |
| 4,135,940 | 1/1979 | Peltier | 106/88 |
| 4,242,142 | 12/1980 | Gee et al. | 106/97 |
| 4,269,628 | 5/1981 | Ballard et al. | 106/86 |
| 4,306,912 | 12/1981 | Forss | 106/117 |
| 4,329,178 | 5/1982 | Kalvenes et al. | 106/87 |
| 4,338,134 | 7/1982 | Münster | 106/85 |
| 4,349,398 | 9/1982 | Kearns et al. | 264/333 |
| 4,373,958 | 2/1983 | Jones et al. | 106/118 |
| 4,378,401 | 3/1983 | Wright | 428/292 |
| 4,407,677 | 10/1983 | Wills, Jr. | 106/97 |
| 4,477,300 | 10/1984 | Pilgrim | 428/703 |
| 4,539,046 | 9/1985 | McAloon et al. | 106/121 |
| 4,617,219 | 10/1986 | Schupack | 428/703 |
| 4,726,713 | 2/1988 | Tallard | 106/117 |
| 4,803,107 | 2/1989 | Knowles | 106/98 |

OTHER PUBLICATIONS

"Preliminary Testing Program Design Systems International Thin–Section Concrete Panels", Design Systems Int'ntl, Clearwater, Fla., Nov. 30, 1988.

*Primary Examiner*—William J. Van Balen

[57] ABSTRACT

The present invention describes an improved composition for structural panel which incorporates Portland cement, clay, grog, and vermiculite. Also described is the method for combining the ingredients to manufacture the improved structural panel.

20 Claims, 4 Drawing Sheets

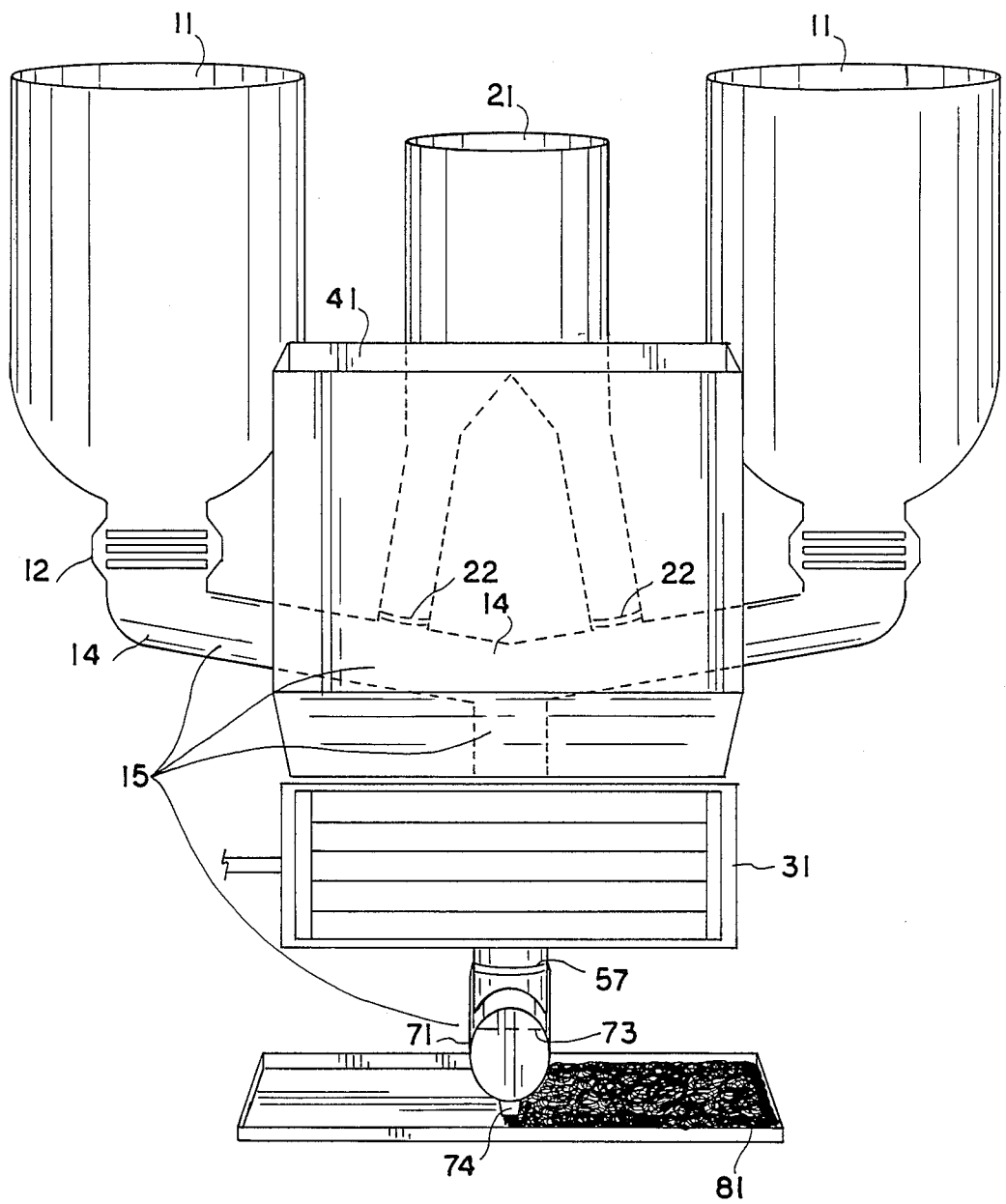
FIG_1

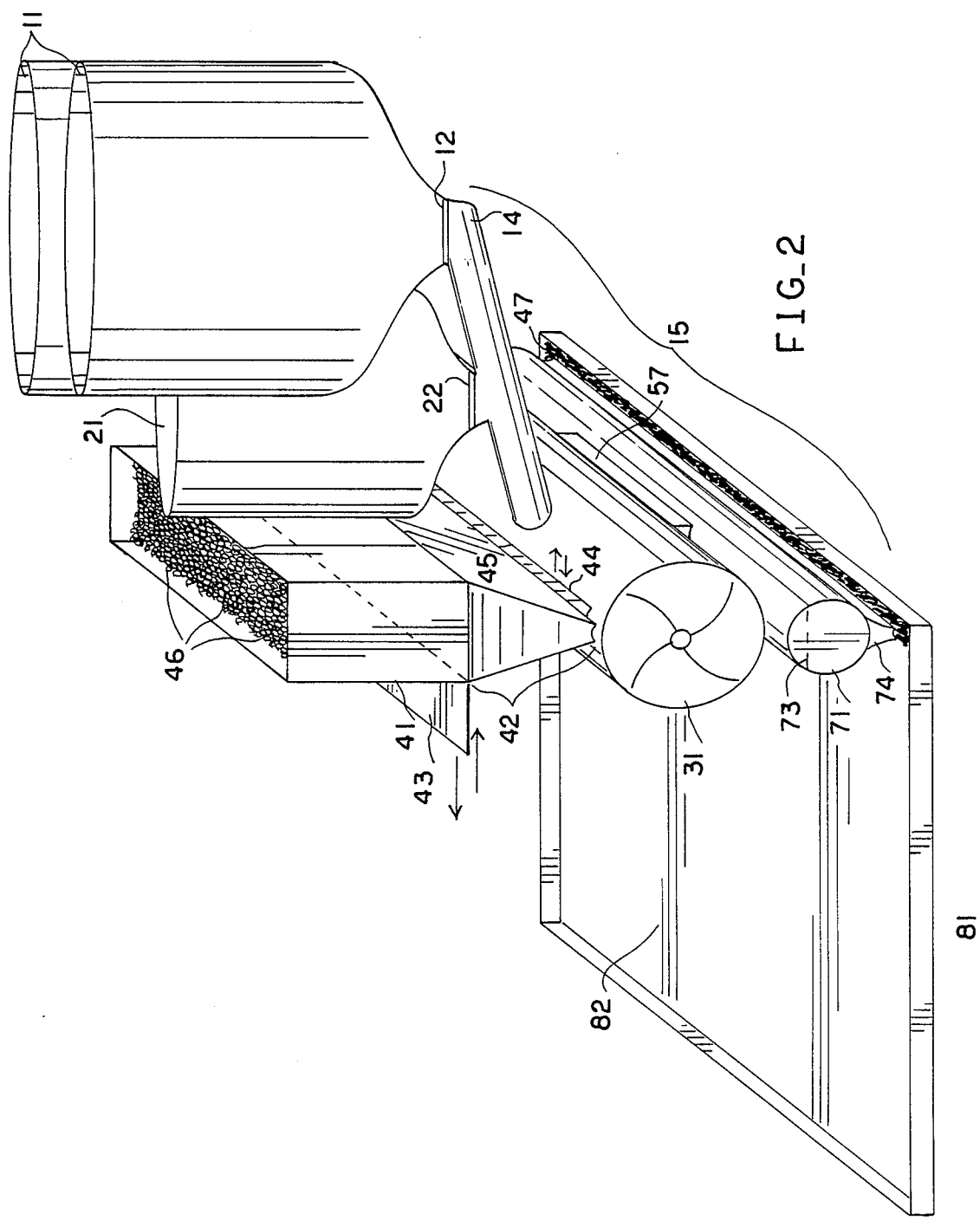
FIG_2

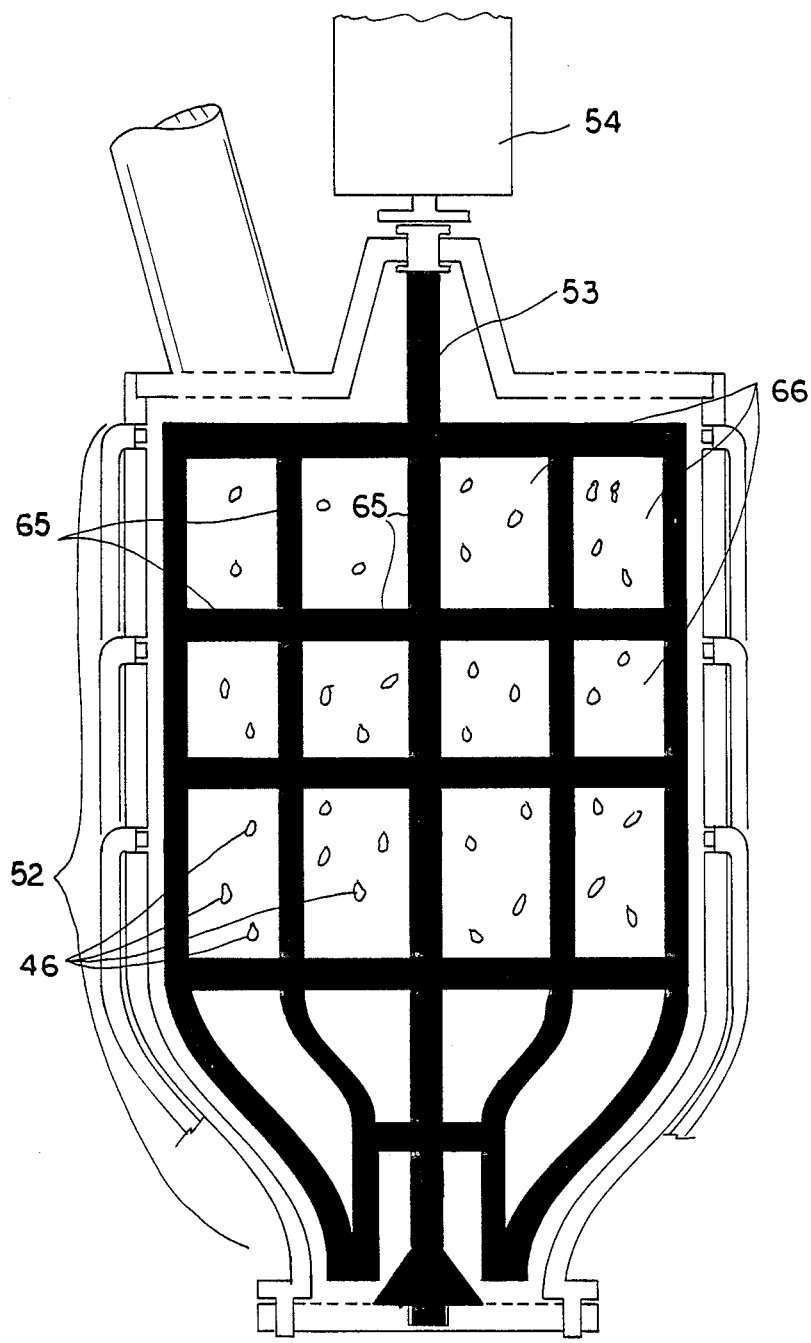
FIG_3

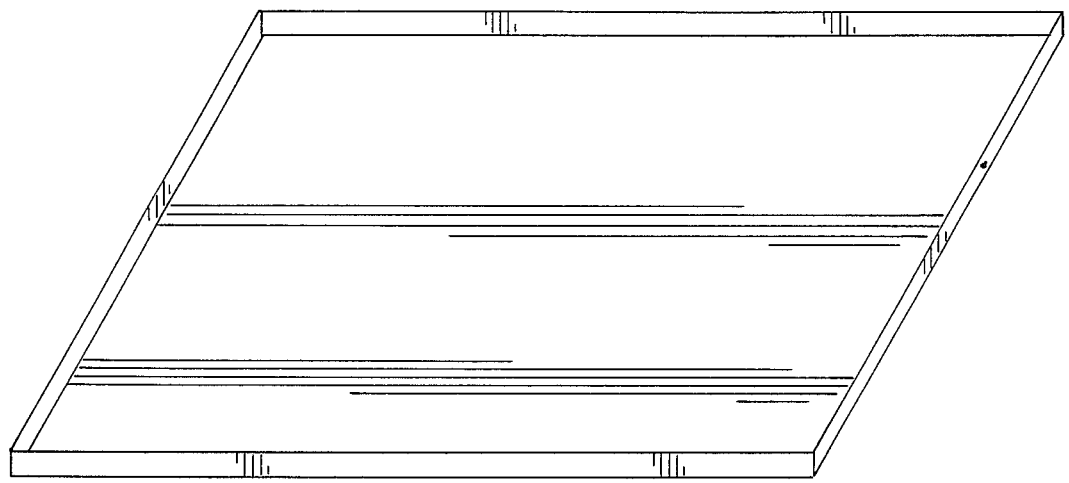
FIG_4
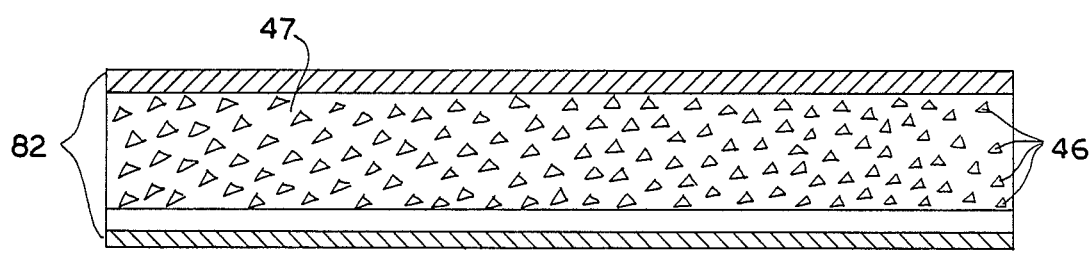
FIG_5

STRUCTURAL PANEL INCORPORATING CLAY GROG AND VERMICULITE AND METHOD FOR MAKING SAID PANEL

BACKGROUND OF THE INVENTION

The invention relates to the manufacture and composition of a structural panel of a form normally used in the construction of residential and commercial buildings.

Reference is made to United States Patent Office Disclosure document 214688, dated Nov. 21, 1988, pursuant to which the inventor recorded with the United States Patent Office, proof of his conception of the idea on or before that date receipt of which has not yet been acknowledged.

Structural panel is frequently used to form the interior walls of residential and commercial structures. Structural panel typically comprises a hardened plaster or cement mixture sandwiched between a screen, scrim, or stabilizing material. Normally some sheet of a smooth material is pasted against one side of the structural panel to give it at least one smooth surface. Structural panel is typically cut to industrially standardized sizes so that its use can be readily planned and the requisite numbers of structural panel sheets can be ordered for use in construction.

One advantage of the use of structural panel is that it is easy to work with. While providing many of the rigidity qualities of concrete, due to its use of cement for substance, the fact that typical structural panel sheets are less than an inch in thickness permits a rather large sheet to be handled by one or two persons. Another advantage of structural panel is that it can easily be cut to appropriate sizes and adjacent sizes of structural panel can be "smoothed together" by a mud solution which is taped over and sanded flush with the surrounding wall. Numerous forms of structural panel are in use, but it is always advanatageous to find a material which satisfies all the requirements of structural panel and is yet lighter, stronger, and easier to work with.

Gypsum plaster is one form of plaster which has experienced widespread use in the manufacture of structural panel. A distinct advantage of the use of gypsum plaster is that it is easy to mold and shape, but its disadvantages are that it is heavy and somewhat brittle. Accordingly, ways of modifying standard guysum plaster have been frequently sought.

One consistent problem with structural panels is the contraction and expansion effects of temperature upon them. Such panels are normally posistioned as closely together as possible in order to provide a smooth wall surface. As described avove, the crack between them is filled with a plaster or mud compound and, upon drying, is sanded or otherwise made flush with the panel surfaces. If the effects of temperature cause the panels to expand or contract however, these joints will be compromised by buckling with expansion or opening cracks during contraction.

Vermiculite is a packing material which is commonly found in particle sizes of approximate equivalents to a person's fingernail. The reason it is useful as a packing material is that it has good insulation qualities, does not deteriorate under the influence of moisture or humidity, and has the quality of providing cushioning. Vermiculite can best be described as a fibrous plastic material with air pockets within its surface. The insulation, durability, and temperature behavior qualities of vermiculite would be appropriate for structural panel. Structural panel however, by its nature and in line with its intended uses, must be a rigid material. The present art does not provide a form of structural panel which adequately makes use of vermiculite.

SUMMARY OF THE INVENTION

The present invention teaches the composition of a structural panel material and manufacture of a form of structural panel which incorporates vermiculite within its substance. Due to its unique blending and solidifying, the present invention provides a form of structural panel which is equally rigid, more water resistant, and is easier to work with due to decreased weight and an increased ability to shape, fit, and size than present forms of structural panel.

The present invention additionally teaches a novel cementious mixture in order to improve the rigidity and strength of the structural panel while keeping the overall panel weight down. This involves the use of clay grog, which has been prefired to at least 3,500 degrees F., as approximately 7% of the substantive material. The other major components of the blend (besides the prefired clay and vermiculite) are a standard portland cement and water or latex.

Additionally, the vermiculite is useful in solving the problems created by expansion and contraction resulting from temperature change. Since the vermiculite particles can be compressed with pressure and will fill back out when the pressure is relieved, a substantial portion of thermal expansion and contraction are internally compensated for within the structural panels. Additionally, is should be pointed out that vermiculate has superior insulation qualities to most existing structural panel materials.

The present invention further teaches a method of manufacturing such a compound. This method generally comprises blending the prefired clay into cement mixed with water, mixing standard vermiculite particles into the blend, pouring the blend into a structural panel-type mold upon one layer of scrim, and then covering the mixture with another layer of scrim and a hard cover until the mixture is dry.

The basic mixture described herein can further be modified by substituting latex for water. This substitution makes the solution more resistant to water than before. Latex can be applied to the mixture at any combination of several different stages. It can be applied to the cement blend, sprayed onto the vermiculite particles, or added in at some point in between.

It is then, an object of the present invention to teach a new and improved composition for structural panel material.

It is a further object of the invention to teach a composition for structural panel which incorporates vermiculite.

It is a further object of the invention to teach a method of manufacturing such a vermiculite incorporating structural panel.

It is a further object of the structural panel to teach an apparatus useful in such a method of manufacturing an improved form of vermiculite incorporating structural panel.

It is ia further object of the invention to provide a structural panel which will not react adversely to significant temperature changes.

Other features and advantages of the present invention will be apparent from the following description in which the preferred embodiments have been set forth in conjunction with the accompanying drawings.

BRIEF DESCRIPTION OF THE DRAWINGS

FIG. 1 is a systemic diagram of the apparatus used to manufacture the improved form of vermiculite structural panel taught herein.

FIG. 2 is a side view of the apparatus depicted in FIG. 1, further depicting the relationship of the vermiculite that to the vats containing the other structural panel components.

FIG. 3 is a close-up view of the vermiculite mixing chamber, depicting the paddles used to blend the vermiculite in with the other structural panel materials.

FIG. 4 depicts a mold of a single piece of structural panel.

FIG. 5 depicts a cross-sectional view of a piece of structural panel, further depicting the use of scrim in its molding and shaping.

Table 1 is a listing of the proportional ingredients required for the manufacture of a structural panel of the present invention.

Table 2 is a report of wicking tests performed on a section of structural panel made according to the present invention.

Table 3 is a report of flame and smoke testing performed on a section of structural panel made according to the present invention.

DETAILED DESCRIPTION OF THE PREFERRED EMBODIMENT

The preferred embodiment of the invention will be described herein, making reference to the above briefly described figures and drawings. Because of the nature of the present invention, it is most difficult to separate the material itself from the method of its manufacture. Consequently the discussion of the preferred embodiment of the present invention will begin by describing its general composition.

The composition of the structural panel of the present invention generally comprises portland cement. (which is well known in the construction material art; a suitable form of building clay grog (which is also well known in the construction art) which is further uniquely blended together with vermiculite and water or water and latex or latex. A scrim is positioned on either side of vermiculite sheets, both to help shape it during the hardening process and to give it surface continuity when placed in use. It is best then, to begin a discussion of its manufacture, by describing the materials to be blended and their general proportions and later providing a suitable method for blending and curing a structural panel.

A basic proportion of the ingredients will first be provided in a table form herein. These amounts are sufficient to make approximately one 3'×5'×½" panel. The provided proportions should be understood to be subject to reasonable modification in order to achieve various desired results as will be more fully described.

TABLE 1

Listing of ingredients for a single panel of approximately
4' × 5' × ½"

40 Cups of Concrete
20 Cups of Coarse Sand
60 Cups of Vermiculite
11 Cups of Clay Grog TABLE 1-continued Listing of ingredients for a single panel of approximately
4' × 5' × ½"

44 Cups of Water

Having provided the basic ingredients of the structural panel, a decription of the process for its manufacture will be undertaken, making reference to the above briefly described figures and drawings.

Portland Cement is thoroughly blended with water in one or more mixing vats (11) and is the first solid material introduced into a flow system (generally 15) by adjustable valves (12) at the desired level of flow. A flow pipe (14) for the concrete is used to transport the Portland Cement through the structural panel manufacturing system (15). Also connected to the concrete flow pipe (14) is one or more clay vats (21). These clay vats (21) are also connected to the system via an adjustable valve (22) which is capable of regulating the flow of clay into the flow system (15). The clay used in the preferred embodiment of the invention should be pre-fired to 3,500 degrees F. and is commonly known as clay grog. The flow pipe (14) then carries the mixture of clay and Portland Cement from the Portland Cement vat (11) and the clay vat (21) into a mixing chamber (31).

On FIG. 1 a vermiculite chamber (41) is depicted. Making reference to FIG. 2, the vermiculite chamber (41) can be more readily understood in a representation of a side view of the mixing chamber (31) and the vermiculite chamber (41). Because particles of vermiculite (46) within the chamber (41) are solid rather than the liquid or semi-liquid cement and clay, it is necesary to have a wide opening to prevent the vermiculite from clogging. Grade 2 vermiculite has been found to be most useful. Rather than the valves as used in the Portland Cement vat (12) or the clay vat at (22) the valve used for the blending of the vermiculite into the system would comprise a dual opening chamber (42). Such a chamber (42) would have an upper opening portion (43) and a lower opening portion (44), said lower opening portion (44) being switchably opened and closed to the final blending chamber (31). The upper opening portion (43) would then be switchably opened and closed to the vermiculite vat (41). The verrmiculate valve chamber (45) would be capable of holding a measurable amount of vermiculate particles.

The cycle of operation of vermiculite valve (42) would work as follows. First, the lower portion (44) would be switched to the closed position and the upper portion (43) switched open. Particles of vermiculite would then flow into the vermiculite valve chamber (45). The chamber (45) would fill with a measured amount of vermiculite particles (generally 46). Then the upper opening portion (43) of the vermiculite valve (42) would be closed. The lower opening portion (44) of the vermiculite valve (42) could then be opened. This would permit all the vermiculite (46) within the vermiculite valve storage chamber (45) to flow, or fall, into the blending chamber (31). By controlling the frequency of each cycle of rotation, vermiculite particles (46) can be added into the blending chamber (31) at a range of speeds.

Also because of the cement valves (12) and the clay valves (22) are all adjustable it is possible to totally control the flow of all materials into the blending chamber (31). Because of their semi-liquid properties, the Portland Cement and the clay are somewhat blended by the time they reach the blending chamber (31). The vermiculite particles (46) however, because of their solid nature, must be blended carefully into the other materials.

Making further reference to FIG. 2, the apparatus for accomplishing this task is described. It should be noted that the blending chamber (31), is generally cylindrical. Several blending paddles (52) turn about an axis (53) which is driven by either an electric or other powered motor (54). The paddles (52) about the axis (53) makes this internal structure resemble a paddle wheel.

Making reference to FIG. 3, the structure of each paddle (52) is depicted. It comprises an outer form (63) which is interconnected by a grid of strong, rigid connecting members (65). The openings (66) of the grid of connecting members (65) are sufficiently large to permit an individual particle of vermiculite (46) to pass between them together with a nearly unobstructed flow of the cement and clay grog. The prolonged interaction of the paddle wheels blending the clay grog, cement, and vermiculite particles (46), has the effect of homogenously mixing the vermiculite particles (46) into the blend as the clay grog and cement forces the vermiculite through the connecting members (65) which evenly spreads the vermiculite particles (46) apart.

When the vermiculite particles (46) are thoroughly mixed in the blend (42), the blend (42) is released through another adjustable valve (57) into a premeasured dispensing vat (71). When the dispensing vat (71) has been filled, a plunging device (73) engages and forces the blend out of the retention chambers (71) through a switchable valve (74). The amount of blended material in the retention valve is measured to be the correct amount required to fill a mold (81) for a piece of structural panel of the desired size.

Prior to forcing the blend (47) into the mold (81) a sheet of scrim (82) is laid along the floor surface (82) of the mold (81). After the mold (81) has been filled with the blended material another layer of scrim (85) is laid against the open side of the structural panel mold (81). A hard cover (86) is then fitted over the top of the structural panel mold (81) to press the blended material (47) and both layers of scrim (85) from the open end (87) of the mold (81) so that the piece of structural panel (91) is made flat at both sides.

The molds (81) may then be transported to another location where they, being laid horizontally, are stored long enough for the fully blended composition (47) to fully harden. The hardening process can be hastened somewhat by the application of heat. A sample of the present invention is enclosed as Exhibit I. Because it is generally flat, but comprises a slightly coarse surface, the scrim is an ideal material to adapt the surface of the structural panel with wallpaper, thick paint, or any other realistic sufacing material.

The inventor has had structural panels manufactured from the described blend and process tested for the purpose of determining product suitability. The elements tested for are "wicking" or the propensity of the material to absorb moisture, and its ability to retard flame and smoke. First presented at Table 2 are test results concerning wicking. The purpose of the testing program was to determine the physical properties of the panel for evaluation and comparison with similar products. The data generated by the testing series should also prove useful in establishing criteria as part of the quality control program required for production.

Additionally, the inventor has had the structural panel tested with respect to withstand the sread of flame as well as its propensity to emit smoke when encountering fire. These test results are attached herein as Table 3.

It should be noted that water is not the only fluid which may be used in blending the solid ingredients of the present invention. One very appropriate substitute for all or any part of the water is a latex fluid. Such a substitution would be particularly helpful in providing a more water resistant product.

It should also be noted that the process for manufacturing the product can be successfully varied. For instance, the appropriate fluid need not be applied all at once in the Portland cement. Additional valving or entry ports could be used to allow the introduction of appropriate amounts of the fluid at any stage of the process. For instance, fluid could be introduced within the clay grog accompanied by additional mixing. Fluid could also be introduced into the flow system between the addition of either the clay grog or the vermiculite. Also fluid could be sprayed into the vermiculite chamber or the mmixiny chamber.

It should finally be noted that the relative proportions of the ingredients can be modified in order to achieve specific performance objectives. For instance the vermiculite particles are lightweight and provide increased temperature resistance qualities in that they are good insulators and serve to internally compensate for contraction and expansion due to temperature differentials. On the other hand, the clay grog is relatively dense and can be increased so as to provide increased panel density. The coherence of the panels is provided by the concrete and coarse sand (which has been alternatively referred to as Portland cement throughout the description) and this component can be increased to provide this quality. Increasing the proportion of any of these elements will, of course, result in a decrease of the amounts and respective performance characteristics of the other materials.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. An improved composition for the manufacture of structural panel comprising the ingredients of concrete, coarse sand, clay grog, standard particles of vermiculite, a binding fluid, and covering layers of scrim.

2. The invention described in claim 1 in which the relative proportion of the ingredients are 23% concrete 12% coarse sand; 34% vermiculite particles; 6% clay grog; and 25% binding fluid.

3. The invention described in claim 1 in which said binding fluid comprises water.

4. The invention described in claim 1 in which said binding fluid comprises a blend latex and water.

5. The invention described in claim 1 which said binding fluid comprises latex.

6. The invention described in claim 2 in which said binding fluid comprises water.

7. The invention described in claim 2 in which said binding fluid comprises a blend of latex and water.

8. The invention described in claim 2 in which said binding fluid comprises latex.

9. An improved composition for the manufacture of structural panel comprising the ingredients of standard Portland cement, clay grog, standard particles of vermiculite, a binding fluid, and covering layers of scrim.

10. The invention described in claim 9 in which the relative proportion of the ingredients are 35% Potland cement, 34% vermiculite particles.

11. The invention described in claim 2 is which the relative proportion of each ingredient may be adjusted no more than 30% of its normal amount so as to achieve particular performance objectives.

12. The invention described in claim 10 in which the relative proportion of the ingredients may be adjusted no more than 30% of its normal amount so as to achieve particular performance objectives.

13. A method for manufacturing an improved structural panel comprising the steps of mixing together a binding fluid with coarse sand and concrete;
   introducing clay grog into said mixture and placing said mixed coarse sand, concrete, and clay grog into a gridded mixing chamber, said grids being of adequate dimension to permit the passage of particles of vermiculite;
   thoroughly blending together said mixed coarse sand, concrete, clay grog, and particles of vermiculite until said blend is substantially homogeneous;
   depositing said homogeneous mixture into a structural panel mold with a layer of scrim on each broad side of said homogeneous mixture;
   permitting said homogeneous mixture to harden together with said layers of scrim.

14. The invention described in claim 13 in which additional binding fluid is introduced into the mixture prior to the introduction of said clay grog.

15. The invention described in claim 13 in which additional binding fluid is mixed with said clay grog prior to the introduction of said clay grog into said mixture.

16. The invention described in claim 13 in which additional binding fluid is introduced into the mixture within said homogeneous mixing chamber.

17. The invention described in claim 13 in which said vermiculite is sprayed with latex prior to its introduction into said homogeneous mixing chamber.

18. The invention described in claim 13 in which additional binding fluid may be introduced at any stage of the process.

19. The invention described in claim 18 in which said vermiculite particles may additionally be sprayed with latex prior to their introduction into said homogeneous mixing chamber.

20. The invention of claim 13 in which the hardening step is hastened by applying heat to said molded scrim and homogeneous mixture.

* * * * *

REEXAMINATION CERTIFICATE (4054th)

United States Patent
Lehan

[11] B1 4,868,039
[45] Certificate Issued Apr. 25, 2000

[54] STRUCTURAL PANEL INCORPORATING CLAY GROG AND VERMICULITE AND METHOD FOR MAKING SAID PANEL

[75] Inventor: Warren A. Lehan, Clearwater, Fla.

[73] Assignee: Caribank, Christ Church, Barbados

Reexamination Request:
No. 90/005,197, Dec. 18, 1998

Reexamination Certificate for:
Patent No.: 4,868,039
Issued: Sep. 19, 1989
Appl. No.: 07/291,616
Filed: Dec. 29, 1988

[51] Int. Cl.$^7$ .......................... B32B 13/02; B32B 13/14; C04B 14/20; B28B 13/02
[52] U.S. Cl. .............. 442/1; 106/716; 264/333; 428/703; 442/42; 442/51; 524/8
[58] Field of Search .............. 106/716; 428/703; 264/333; 442/1, 42, 51

[56] References Cited

U.S. PATENT DOCUMENTS

| | | |
|---|---|---|
| 1,439,954 | 12/1922 | Emerson . |
| 3,284,980 | 11/1966 | Dinkel . |
| 3,762,122 | 10/1973 | Grassl et al. .......................... 52/745.19 |
| 3,944,425 | 3/1976 | Magder ........................................ 501/84 |
| 4,102,700 | 7/1978 | Kwech et al. . |
| 4,488,909 | 12/1984 | Galer . |
| 4,670,055 | 6/1987 | Koslowski .............................. 106/677 |
| 4,740,486 | 4/1988 | Keller, Jr. .................................. 501/83 |
| 4,780,433 | 10/1988 | Keller, Jr. .................................. 501/80 |
| 4,868,039 | 9/1989 | Lehan . |
| 4,873,207 | 10/1989 | Keller, Jr. .................................. 501/80 |

OTHER PUBLICATIONS

O'Bannon, Loran S., Dictionary of Ceramic Science and Engineering; Plenum Press; New York; 1984, pp. 61, 62, 127.

Dodd, A.E.; Dictionary of Ceramics; Philosophical Library Inc; New York; 1964; pp. 102, 132, 166.

A.M. Neville and J.J. Brooks, "Concrete Technology", pp. 1–39, 124–163, 345–363, 1987.

Robert F. Blanks and Henry L. Kennedy, "The Technology of Cement and Concrete Materials", p. 410 (1955).

Portland Cement Association, "Design and Control of Concrete Mixtures", pp. 100–102 (11$^{th}$ ed. 1968).

George E. Troxell et al., "Compositions and Properties of Concrete", pp. 368–369 (2d ed. 1968).

Stanley Abercrombie, "Ferrocement Building with Cement, Sand, and Wire Mesh", p. 182 (1977).

R.W. Steiger and M.K. Hurd, "Lightweight Insulating Concrete for Floors and Roof Decks," *Concrete Construction*, pp. 411–413, 415, 420, 422 (Jul. 1978).

F.E. Childs, "Insulants and Refractories; Vermiculite," *Mining Annual Review*, Metals and Minerals Section, p. 142 (1985).

*Primary Examiner*—Jenna Davis

[57] ABSTRACT

The present invention describes an improved composition for structural panel which incorporates Portland cement, clay, grog, and vermiculite. Also described is the method for combining the ingredients to manufacture the improved structural panel.

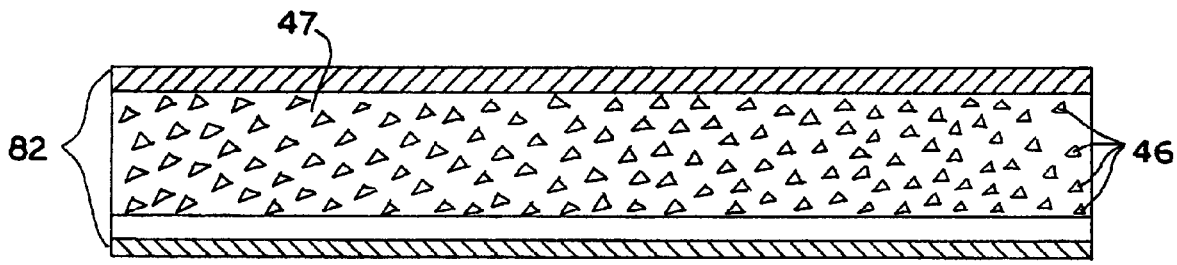

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *